(12) United States Patent
Pramod et al.

(10) Patent No.: US 10,404,197 B2
(45) Date of Patent: Sep. 3, 2019

(54) FEEDFORWARD CONTROL OF PERMANENT MAGNET DC MOTORS

(71) Applicant: STEERING SOLUTIONS IP HOLDING CORPORATION, Saginaw, MI (US)

(72) Inventors: Perit Pramod, Saginaw, MI (US); Rakesh Mitra, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 58 days.

(21) Appl. No.: 15/715,375

(22) Filed: Sep. 26, 2017

(65) Prior Publication Data
US 2019/0097556 A1 Mar. 28, 2019

(51) Int. Cl.
*H02P 7/06* (2006.01)
(52) U.S. Cl.
CPC ..................... *H02P 7/06* (2013.01)
(58) Field of Classification Search
CPC ......... B63H 20/007; B63H 21/17; H02P 6/18; G01R 31/00; G01R 31/34; G01R 31/343
See application file for complete search history.

(56) References Cited

U.S. PATENT DOCUMENTS

| | | | | |
|---|---|---|---|---|
| 6,831,477 B2 * | 12/2004 | Fukusumi | ............ | G01R 31/343 324/765.01 |
| 6,986,688 B1 * | 1/2006 | Jansen | ................. | B63H 20/007 440/1 |
| 8,247,944 B2 * | 8/2012 | Gebregergis | ........... | H01R 39/40 310/242 |

\* cited by examiner

*Primary Examiner* — Rina I Duda

(57) ABSTRACT

Technical solutions are described for a motor control system that includes a feedforward control module to control an output torque generated by the motor. The feedforward controlling includes computing a first voltage command for the motor based on an input torque signal. Further, the feedforward controlling includes computing a second voltage command for the motor based on a brush drop voltage of the motor and a back-EMF drop voltage of the motor. Further, feedforward controlling includes computing a voltage command for the motor by summing the first voltage command and the second voltage command. Further yet, the feedforward controlling includes sending the voltage command to the motor for generating the output torque.

20 Claims, 10 Drawing Sheets

FEEDFORWARD CONTROL OF PERMANENT MAGNET DC MOTORS

BACKGROUND

The present application generally relates to permanent magnet DC motors (PMDC motors), and specifically to facilitating feedforward torque and current control of such motors.

Permanent Magnet DC (PMDC) motors are widely employed for motion control applications such as in electric power steering (EPS) systems, power tools, among others. The torque control of PMDC motor drives is performed through current regulation utilizing measured current feedback (through current measurement circuitry). Feedback current control performed in such a manner provides tunable current (and thus torque) control bandwidth characteristics, improved disturbance rejection and reduced sensitivity to modeling uncertainty. Another advantage of using PMDC motor drives with feedback control operation is that position or velocity measurements are not required for control. It should be noted however that motor velocity is an important signal that enhances system control performance as it can be used for power limiting, compensator gain scheduling and other similar control features.

Feedforward current and torque control of PMDC motor drives is another mode of operation. Feedforward control mode requires an accurate model of the machine, including nonlinearities (such as brush drop voltage), and has low bandwidth (limited by sampling rate) and poor disturbance rejection performance characteristics. However, it is typically not prone to instabilities (due to open loop nature) and is noise free because current sensors are not usually required for implementation of feedforward control. Further, the noise transmission characteristics of feedforward control systems is lower as compared to feedback control systems.

Accordingly, it is desirable to use feedforward current control to operate PMDC motors in applications, such as EPS systems, power tools, among others.

SUMMARY

According to one or more embodiments a motor control system includes a feedforward control module to control an output torque generated by the motor. The feedforward controlling includes computing a first voltage command for the motor based on an input torque signal. Further, the feedforward controlling includes computing a second voltage command for the motor based on a brush drop voltage of the motor and a back-EMF drop voltage of the motor. Further, feedforward controlling includes computing a voltage command for the motor by summing the first voltage command and the second voltage command. Further yet, the feedforward controlling includes sending the voltage command to the motor for generating the output torque.

Further, one or more embodiments are described for a method for controlling a motor using feedforward control, the motor being a permanent magnet DC. The method includes computing, by a motor control system, a first voltage command for the motor based on an input torque signal. The method further includes computing, by the motor control system, a second voltage command for the motor based on a brush drop voltage of the motor and a back-EMF drop voltage of the motor. The method further includes computing, by the motor control system, a voltage command for the motor by summing the first voltage command and the second voltage command. The method further includes sending, by the motor control system, the voltage command to the motor for generating an output torque.

Further yet, one or more embodiments are described of a system that includes a motor, and a motor control system. The motor control system includes a controller module that controls output torque of the motor by feedforward current control. The feedforward current control includes computing a first voltage command for the motor based on an input torque signal. The feedforward current control further includes computing a second voltage command for the motor based on a brush drop voltage of the motor and a back-EMF drop voltage of the motor. The feedforward current control further includes computing a voltage command for the motor by summing the first voltage command and the second voltage command. The feedforward current control further includes sending the voltage command to the motor for generating the output torque.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
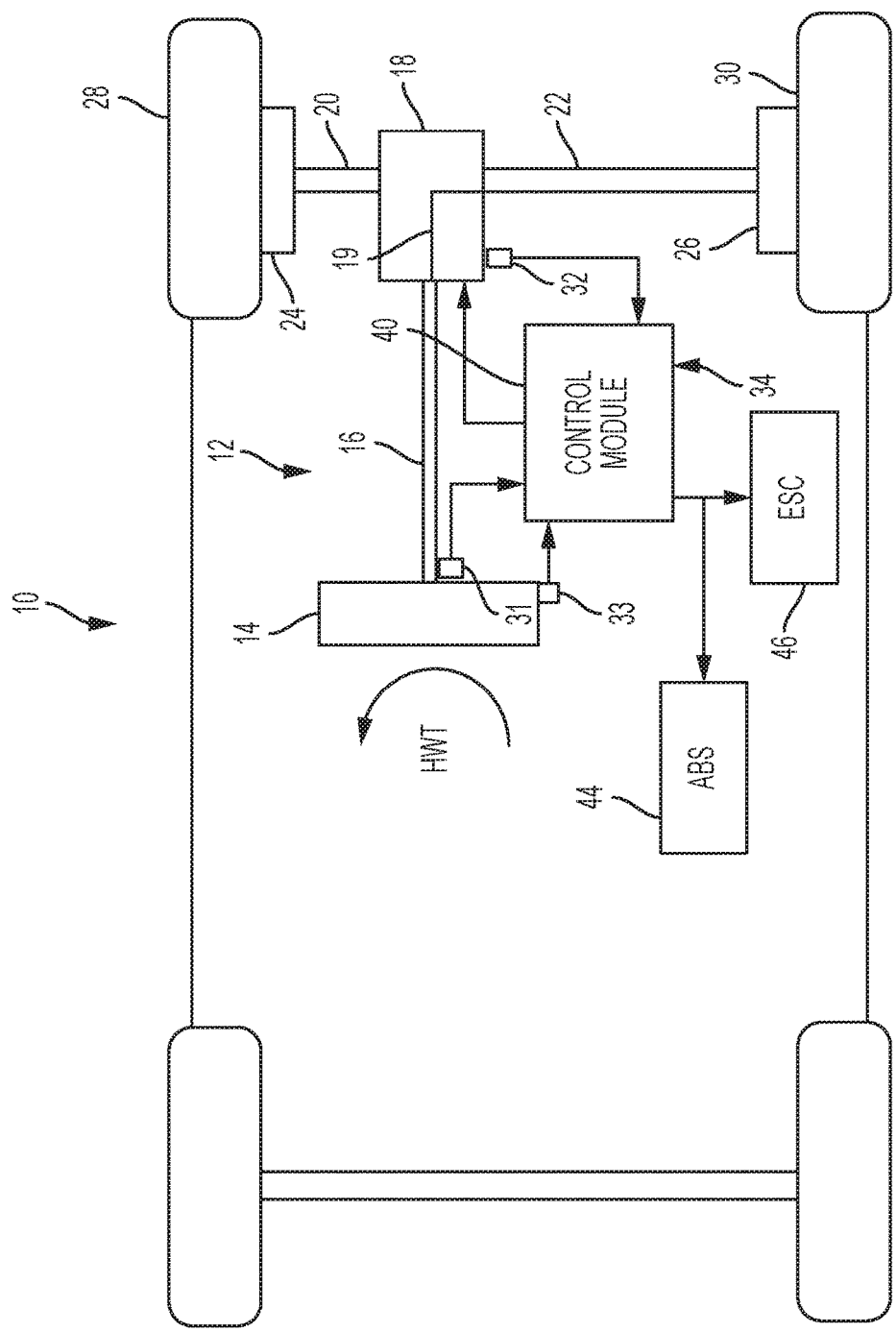
FIG. 1 is an exemplary embodiment of a vehicle including a steering system.

Referring now to the Figures, where the technical solutions will be described with reference to specific embodiments, without limiting same, FIG. 1 is an exemplary embodiment of a vehicle 10 including a steering system 12. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 32 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning to control aspects of the steering system 12 through the steering assist unit 18. Communication with other subcomponents of the vehicle 10, such as an Anti-lock Braking System (ABS) 44, an Electronic Stability Control (ESC) system 46, and other systems (not depicted), can be performed using, for example, a controller area network (CAN) bus or other vehicle network known in the art to exchange signals such as the vehicle speed signal 34.

In one or more examples, the motor 19 is a PMDC motor that is controlled using technical solutions described herein. It should be noted that although embodiments of steering system 12 are discussed herein, the technical solutions described herein for feedforward control of PMDC motors are applicable in any application using PMDC motors, such as watercrafts, power tools, rotor pumps, and any other such applications. PMDC motor drives are extensively used in industry for low-cost applications. Typically, feedback current control techniques are used for the current and torque control of PMDC machines. The technical solutions described herein facilitate using feedforward control and thus providing several advantages. For example, using feedforward control does not require current sensors when position or velocity sensors are available, providing cost savings. Further, feedforward control reduces instability due to open loop nature of motor control system. Further yet, feedforward control provides for fault tolerant control operation of PMDC based drive system. Additional advantages will be readily understood by person skilled in the art. The technical solutions described herein provide several configurations of feedforward control of PMDC motors that may be utilized for different applications.

Feedforward current control, unlike feedback current control, uses motor velocity for current control. It should be noted that feedback control does not "require" velocity, however, the motor velocity is used to enhance performance of the feedback control. On the other hand, feedforward control cannot be performed without velocity. While motor velocity may be measured using velocity sensors, or obtained by differentiating position signals measured by position sensors, it may also be estimated using observers.

The model of PMDC machines is composed of two governing equations which relate the voltage, current and (electromagnetic) torque of the machine as follows.

$$v = e_g + Ri_a + L\frac{di_a}{dt} + v_b \quad \text{Eq (1)}$$
$$= K_e \omega_m + Ri_a + L\frac{di_a}{dt} + v_b$$
$$T_e = K_e i_a$$

where v, $i_a$ and $T_e$ are the input voltage, current and electromagnetic torque of the machine respectively. $K_e$, R and L represent the machine back-EMF (and torque) constant, motor circuit resistance and inductance respectively. $e_g$ represents the back-EMF drop voltage, and $v_b$ is the nonlinear brush drop voltage and is a function of the current as follows.

$$v_b = \sigma(i_a)V_0 \left(1 - e^{-\left|\frac{i_a}{I_0}\right|}\right) \quad \text{Eq (2)}$$

where $V_0$ and $I_0$ are brush drop parameters. In general, all machine parameters are nonlinear functions of operating temperature and magnetic saturation (caused by high current operation).

Further, the electrical parameters of the motor 19, namely the back-EMF constant or torque constant $K_e$, resistance R, and inductance L vary dynamically with the operating condition of the motor 19. The governing equation for parameter variations for a given magnet temperature $\theta_{Tm}$ can be expressed as, $$K_e = \gamma_{K_e}(K_{en}(1+\alpha_M(\theta_{Tm}-\theta_n))), \quad \text{Eq (3)}$$

where $\gamma_{K_e}$ is a scaling factor accounting for magnetic saturation, and is a function of motor current $i_a$. Further, $\alpha_M$ is a constant representing a thermal coefficient of the permanent magnet material used in the motor 19.

Further, the inductance of the motor 19 can be described by the equation, $$L = \gamma_L L_n, \quad \text{Eq (4)}$$

where $\gamma_L$ is a scaling factor for inductance based on the magnetic saturation characteristics of the motor 19, and is a function of the motor current $I_a$.

Further yet, the motor circuit resistance can be described by the equation, $$R = R_{FET}(1 + \alpha_{Si}(\theta_{TSi} - \theta_n)) + R_m(1 + \alpha_{Cu}(\theta_{TCu} - \theta_n)), \quad \text{Eq (5)}$$

where $R_{FET}$ is the nominal value of FET resistance, $\alpha_{Si}$ is a constant representing the thermal coefficient of silicon, $\theta_{TSi}$ is the temperature of the FETs at the operating condition, $\theta_n$ is the nominal temperature at which $R_{FET}$ is measured, $R_m$ is the nominal value of motor resistance, $\alpha_{Cu}$ is a constant representing the thermal coefficient of the copper windings, $\theta_{TCu}$ is the temperature of the windings at the operating condition, $\theta_n$ is the nominal temperature at which $R_m$ is measured.

The equation above for the resistance provides the motor circuit resistance rather than the resistance of the motor windings only. In one or more examples, the aforementioned models of the parameter variations are employed to continuously estimating the motor parameters in real-time, or near real-time, which results in improved estimation of the signals used by the motor control system.

From a control system design perspective the PMDC motor is a plant, and the time domain model of the PMDC motor presented earlier may be transformed into the s-domain as, $$V(s) = (Ls + R)I_a(s) + E_g(s) + V_B(s) \quad \text{Eq (6)}$$

Figure 2:
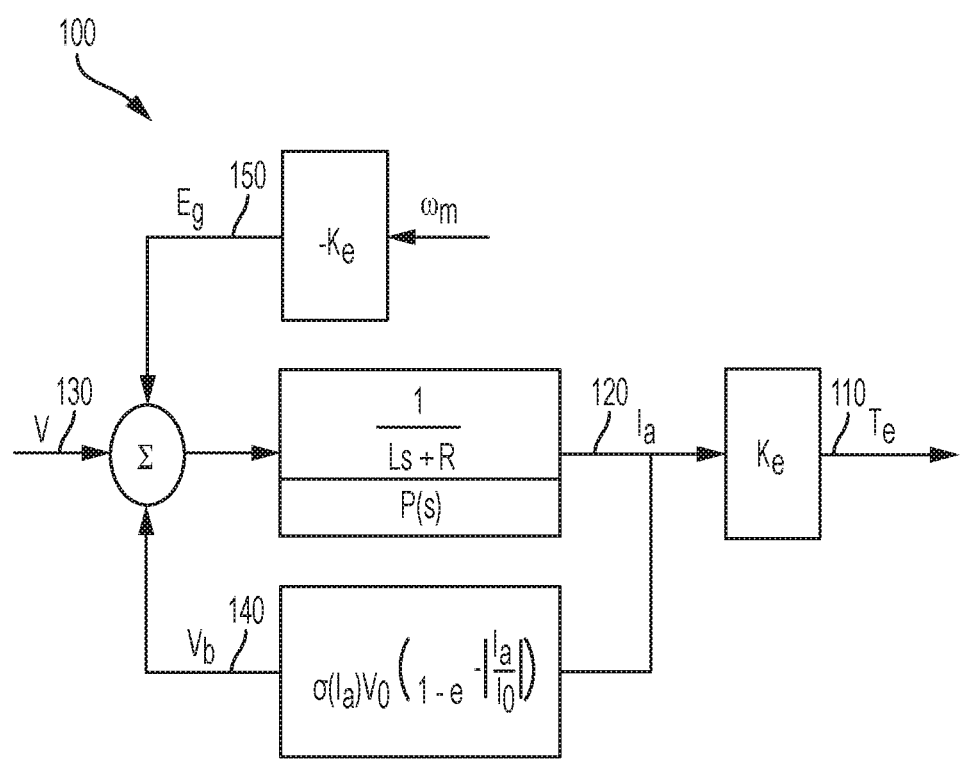
FIG. 2 depicts a block diagram of a PMDC motor electrical system plant model according to one or more embodiments.

FIG. 2 depicts a block diagram of a PMDC motor electrical system plant according to one or more embodiments. As depicted the torque output 110 of a PMDC motor 100 is based on a current output 120 and the back-EMF constant $K_e$. Further, the output current 120 is based on an input voltage command (V) 130, the brush drop voltage ($V_b$) 140, and the back-EMF drop voltage ($E_g$) 150.

Figure 3:
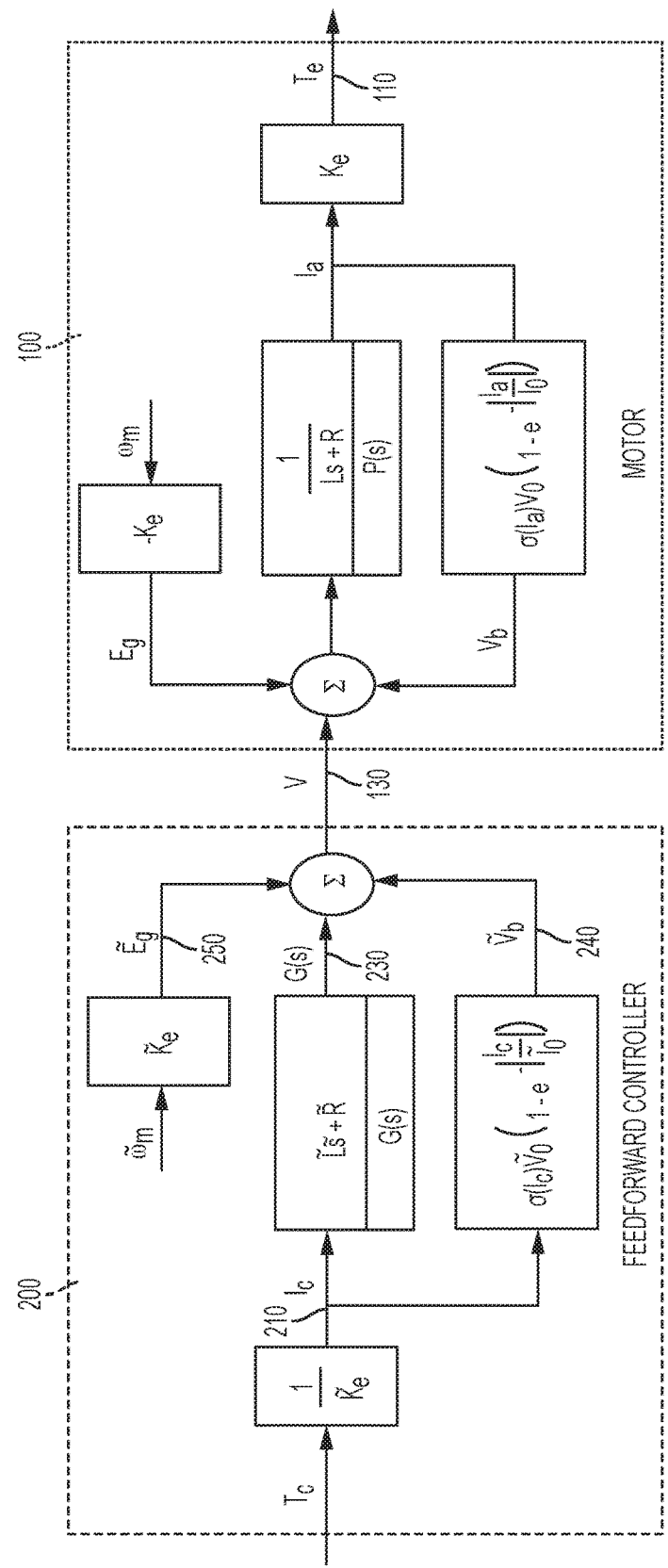
FIG. 3 depicts a block diagram of a system for feedforward current (and torque) control according to one or more embodiments.

FIG. 3 depicts a block diagram of a system for feedforward current (and torque) control according to one or more embodiments. The motor control system 200 facilitates feedforward control of the PMDC motor 100 and accordingly controls the torque output of the PMDC motor 100. In one or more examples, the motor control system 200 includes a feedforward current controller among other components. The present disclosure uses the term 'motor control system' to refer to the feedforward current controller. In one or more examples, the motor control system 200 controls the torque output 110 of the PMDC motor 100 by computing voltages using an inverse of the machine model of the PMDC motor 100 with estimated parameters and commanded current.

As depicted the voltage command V 130 is composed of G(s) 230 that is based on an input current command ($I_C$) 210, an estimated brush drop voltage ($\tilde{v}_b$) 240, and an estimated back-EMF drop voltage ($\tilde{e}_g$) 250.

The motor control system 200 generates the estimated brush drop voltage 240 using the expression:

$$\tilde{v}_b = \sigma(I_c)V_0\left(1 - e^{-\left|\frac{I_C}{I_0}\right|}\right) \quad \text{Eq (7)}$$

where $V_0$ and $I_0$ are predetermined brush drop parameters, and $I_c$ is the current command. Note that while the brush drop estimate is shown to be a function of the current command, it may also be estimated by replacing the current command by the measured motor current if motor current measurements are available.

Further, the motor control system 200 includes G(s) 230 based on the motor circuit resistance (R), and inductance (L) values, for the input current command ($I_C$) 210. The motor circuit resistance and inductance values are predetermined values, or estimated values. Note that the approximation of the derivative term $\tilde{s}$ may be of a standard form such as $$\frac{s}{(\tau s + 1)^n}$$

which may then be discretized using different techniques such as backward difference, bilinear transform etc, or may be a direct digital derivative design with very targeted gain and phase responses for obtaining desired accuracy, complexity and noise transmission characteristics.

As depicted, the motor control system 200 generates the estimated back-EMF drop voltage ($\tilde{E}_g$) 250 based on the predetermined back-EMF constant value and an estimated motor velocity ($\omega_m$). The motor velocity signal may be measured using a velocity sensor, or obtained by differentiating motor position obtained from a position sensor.

Figure 4:
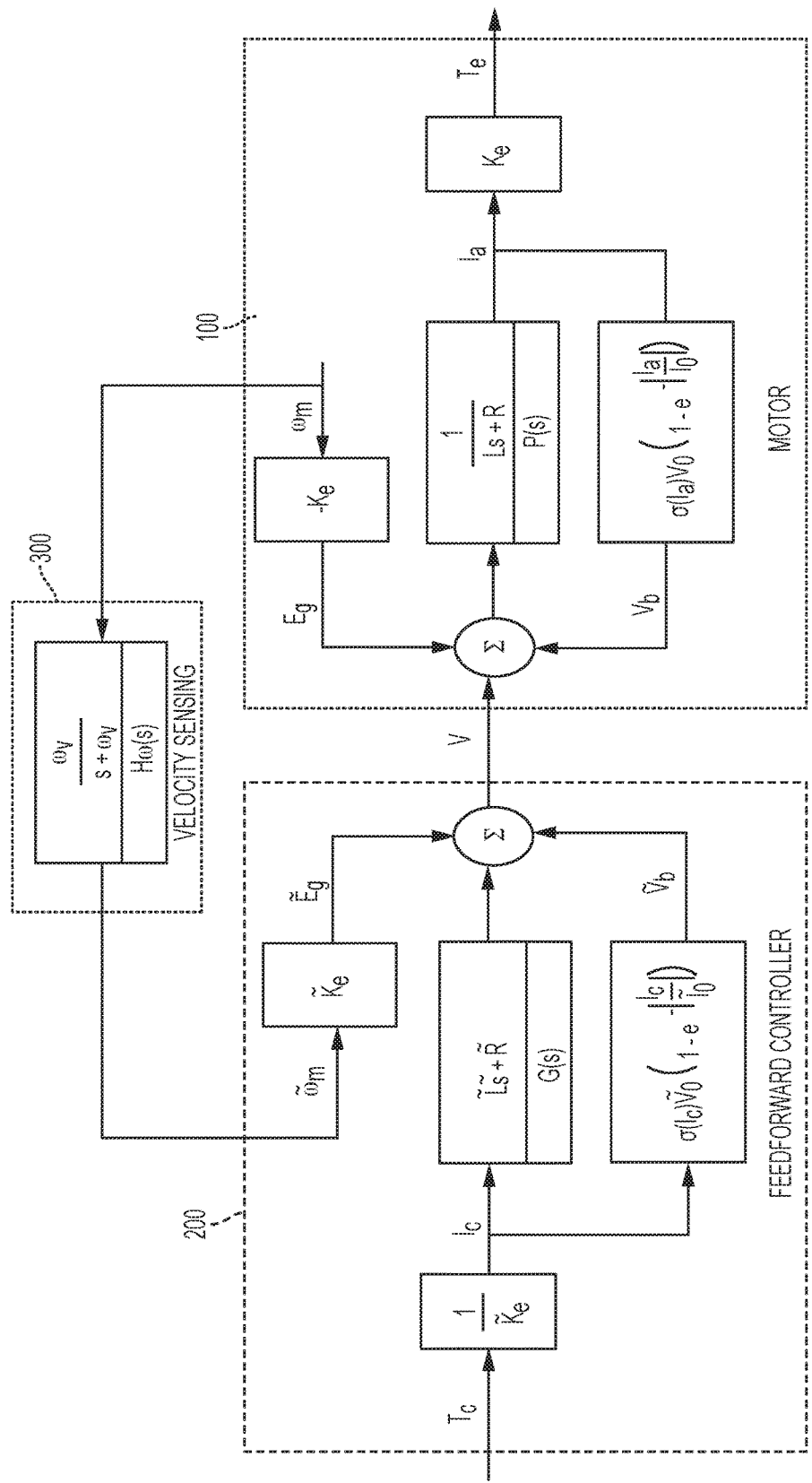
FIG. 4 depicts a feedforward control utilizing velocity sensing circuitry according to one or more embodiments.

FIG. 4 depicts a feedforward control utilizing velocity sensing circuitry according to one or more embodiments. A velocity sensing circuitry 300 monitors the motor velocity and provides the detected velocity as an input to the motor control system 200. The velocity sensing circuitry 300 has a transfer function $H_\omega(s)$ that represents the velocity sensor dynamics. It should be noted that the transfer function may be different from the first order transfer function shown in FIG. 4 depending on the specific sensor characteristics. In one or more examples, a low pass filter may use a predetermined cutoff frequency ($w_v$) that depends on the motor velocity.

However, adding a velocity sensor increases cost and complexity, especially in cost-sensitive applications such as an EPS.

Figure 5:
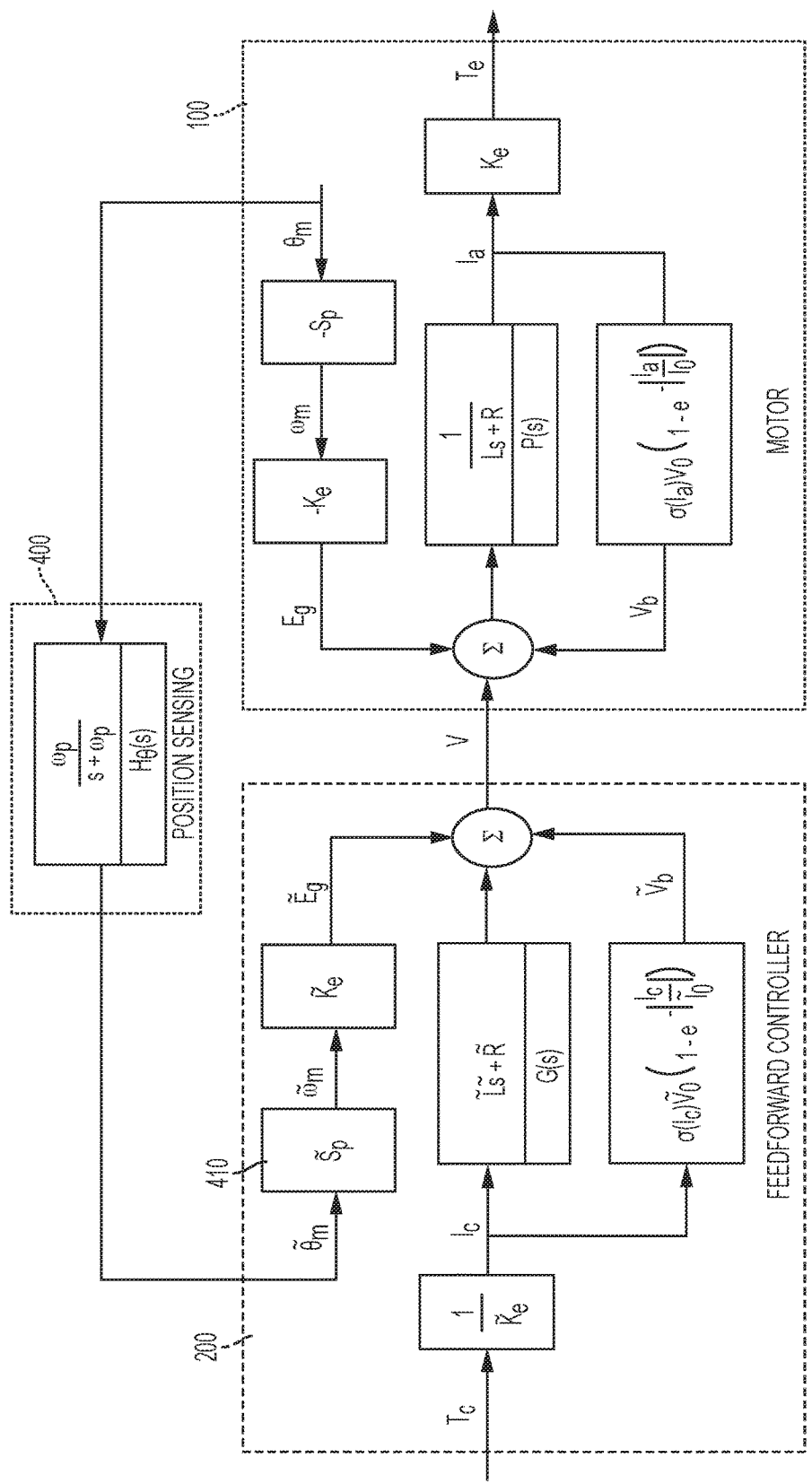
FIG. 5 depicts a feedforward control utilizing velocity computed from a position sensor according to one or more embodiments.

FIG. 5 depicts a feedforward control utilizing velocity computed from a position sensor according to one or more embodiments. A position sensing circuitry 400 monitors a position of the motor and provides the detected position as an input to the motor control system 200. In one or more examples, the position sensing circuitry 400 is cheaper than the velocity sensing circuitry 300.

In one or more examples, the motor control system 200 includes a motor velocity module 410 that computes the estimated motor velocity based on the motor position signal. For example, the motor velocity module 410 computes the motor velocity by differentiating the motor position signal. In one or more examples, the motor position signal provides angular position of the motor shaft.

The derivative implementation $\tilde{s}_p$ for obtaining the estimated motor velocity from the motor position signal may be of a form such as $$\frac{s}{(\tau s + 1)^n},$$

which may then be discretized using different techniques such as backward difference or bilinear transform, or may be a direct digital derivative design with very targeted gain and phase responses for obtaining desired accuracy, complexity and noise transmission characteristics. It should be noted that in other examples the transfer function $H_θ(s)$ representing the position sensor dynamics, may differ from the first order transfer function shown in the figure depending on the specific sensor characteristics.

Figure 6:
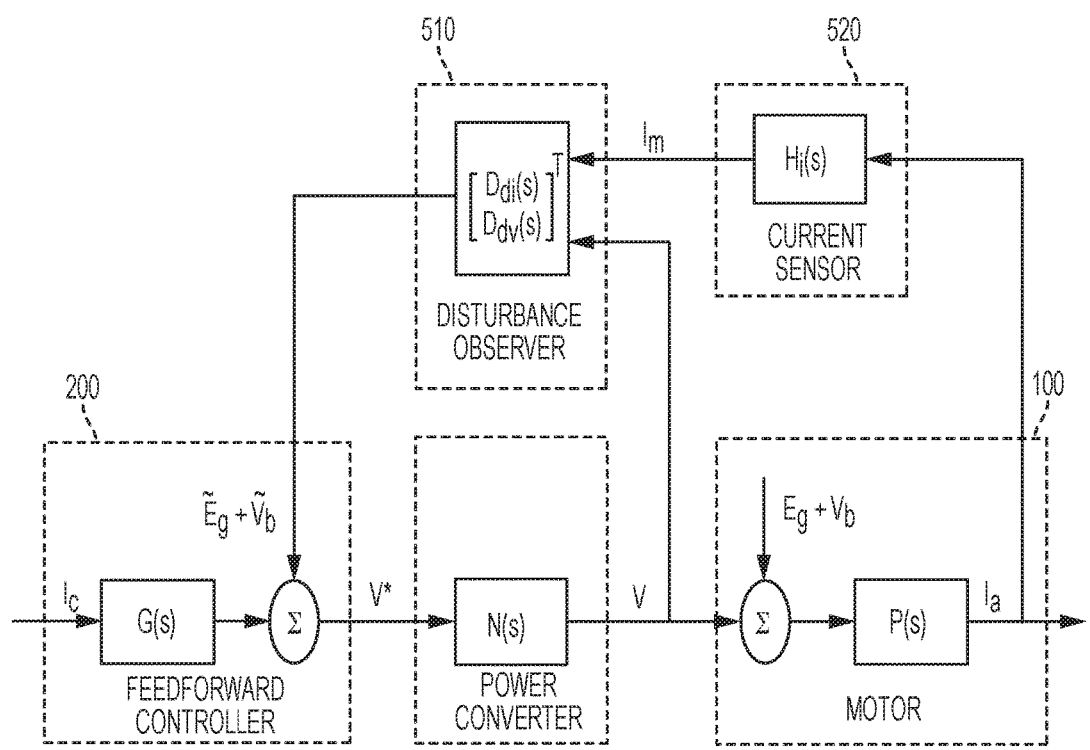
FIG. 6 depicts a block diagram of feedforward control utilizing disturbance estimating circuitry according to one or more embodiments.

FIG. 6 depicts a block diagram of feedforward control utilizing disturbance estimating circuitry according to one or more embodiments. A disturbance estimating circuitry 500 is used which includes a disturbance observer module 510 for determining a disturbance estimate of the PMDC motor 100. The disturbance estimate includes the back-EMF (BEMF) and the brush drop of the PMDC system 100. In one or more examples, an estimated motor velocity signal is extracted from the disturbance estimate using a feedforward model of the non-linear brush drop. The motor control system 200 uses the determined disturbance estimate for feedforward compensation of the disturbance itself because the disturbance estimate is composed of the estimated brush drop voltage ($\tilde{V}_b$) 240, and an estimated back-EMF drop voltage ($\tilde{E}_g$) 250. In one or more examples, a tuning is embedded in the disturbance observer module 510 for making the estimator tuning easy and intuitive for an operator.

For example, the PMDC motor model in s-domain presented earlier (Eq (6)) may be represented as:

$$V(s) = (Ls+R)I_a(s) + D(s),  \quad \text{Eq (8)}$$

where $D(s)$ represents the disturbance that is a composition of the $E_g(s) + V_B(s)$, the back-emf drop 250 and the brush drop voltage 240.

The disturbance observer module 510 operates according to a plant model that may be expressed in state space form as follows.

$$\dot{\hat{x}}_d = A_d \hat{x}_d + B_d u_d + L_d(y_d - C_d \hat{x}_d),  \quad \text{Eq (9)}$$

where the state, input and output vectors are $\hat{x}_d = [\hat{I} \ \hat{d}]^T$, $u_d = V$, $y_d = I_m$, and the disturbance $d = \tilde{E}_g + \tilde{V}_b$. The observer gain matrix may be written as $L_d = [L_1 \ L_2]^T$ and the gain tuning may be performed using techniques such as pole placement or any of the optimal control techniques. The $I_m$ is measured output current of the motor 19, for example by a current sensor 520. The remaining observer matrices are constructed using estimated parameters in the plant model as shown below.

$$A_d = \begin{bmatrix} -\frac{\hat{R}}{\hat{L}} & \frac{1}{\hat{L}} \\ 0 & 0 \end{bmatrix}$$

$$B_d = \begin{bmatrix} \frac{1}{\hat{L}} & 0 \end{bmatrix}^T$$

$$C_d = [1 \ 0]$$

Further, the disturbance estimate d is considered to be a state of the motor control system with an unknown initial condition. With this assumption, the unknown step function has a derivative of zero, and accordingly, the modified plant model may be written as, $$\frac{d}{dt}\begin{bmatrix} i_a \\ d \end{bmatrix} = \begin{bmatrix} -\frac{R}{L} & \frac{1}{L} \\ 0 & 0 \end{bmatrix} \begin{bmatrix} i_a \\ d \end{bmatrix} + \begin{bmatrix} \frac{1}{L} \\ 0 \end{bmatrix} v \quad \text{Eq (10)}$$

The state space representation can be converted to transfer matrix form by taking the Laplace transform as shown below.

$$\begin{bmatrix} \hat{I} \\ \hat{d} \end{bmatrix} = (sI_d - A + L_d C_d)^{-1} B_d V + (sI_d - A + L_d C_d)^{-1} L_d I_m \quad \text{Eq (11)}$$

where $I_d$ is the identity matrix. Thus, the disturbance estimate d may be written in terms of transfer functions as shown below.

$$[\hat{d}] = [D_{di}(s) \ D_{dv}(s)] \begin{bmatrix} I_m \\ V \end{bmatrix} \quad \text{Eq (12)}$$

It should be noted that while the full order observer is described here, in one or more examples, a reduced order observer may be implemented instead. Also, it should be noted that the current sensor transfer function $H_i(s)$ depends on the sensor under consideration.

Thus, the technical solutions using the disturbance estimation using an observer to provide feedforward control of the motor 19. It should be noted that the disturbance estimator $D(s) = [D_{dv}(s) \ D_{di}(s)]$ requires current measurement ($I_m$), and thus under current sensor failure conditions, the disturbance estimation fails to operate thus preventing the feedforward controller 200 from operating.

It should also be noted that while the disturbance observer based feedforward current controller shown in FIG. 6 illustrates the disturbance estimate being composed of both the back-EMF and the brush drop estimate, a different implementation is also possible where the disturbance estimator is a back-EMF estimator only, and the brush drop compensation is performed using a feedforward brush drop model using current command as mentioned in Eq 7. Such an estimator uses an electrical plant model of a PMDC motor without including the brush drop term described herein.

Figure 7:
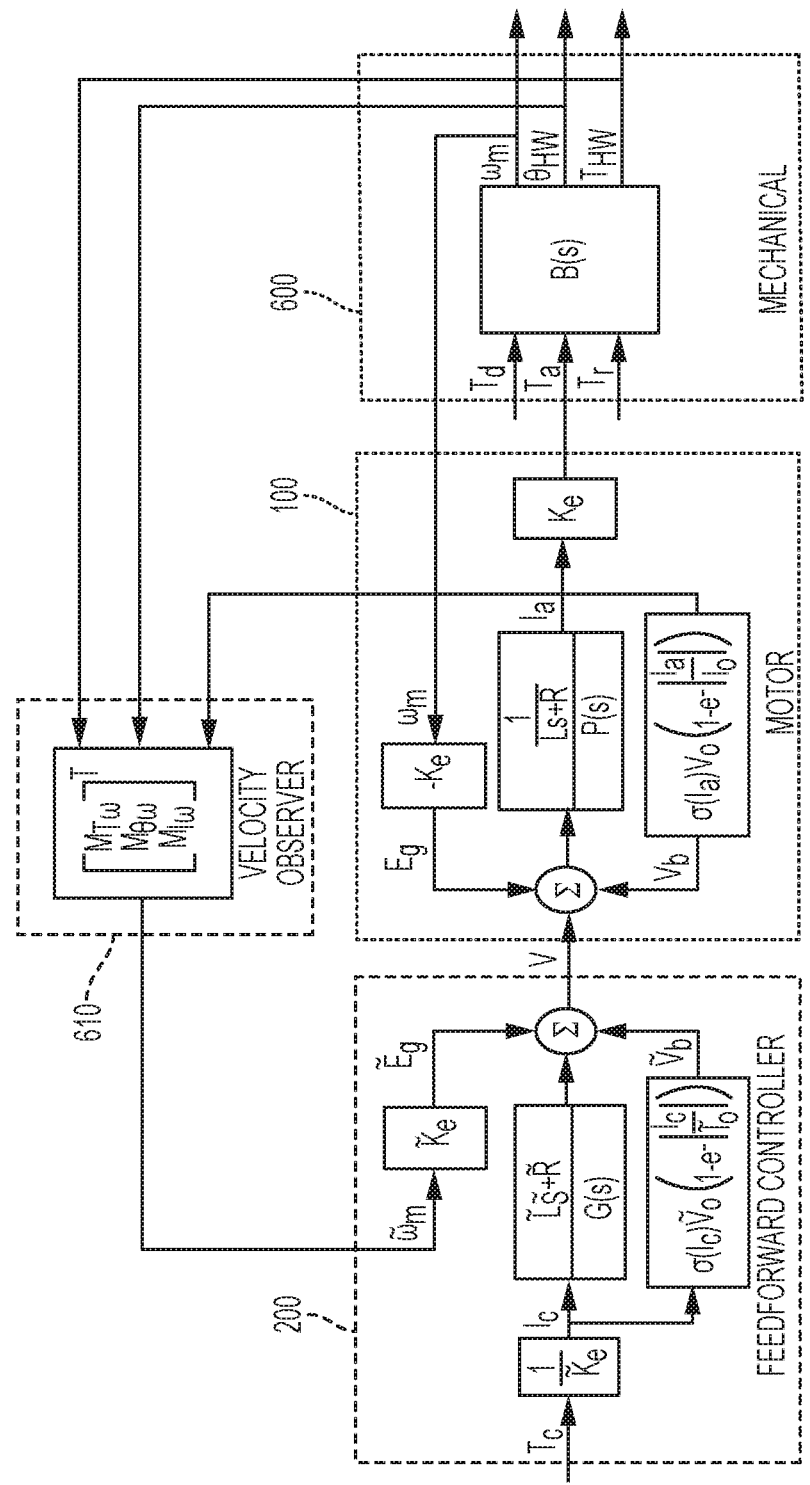
FIG. 7 depicts a block diagram of a motor control system for operating a PMDC motor using feedforward current control with a velocity observer implemented using the mechanical plant model of a EPS system in which the PMDC drive system is being used according to one or more embodiments.

FIG. 7 depicts a motor control system that uses an observer module which is based on the mechanical model of the system in which the PMDC drive system is being used according to one or more embodiments. The motor control system 200 uses a velocity observer module 610 that provides an estimated motor velocity signal based on a mechanical model 600 of a system to which the motor 100 is providing torque.

For example, if the electro-mechanical system under consideration is the EPS 12, the velocity observer 610 estimates the motor velocity based on a mechanical plant model of the EPS 12. In one or more examples, the state observer module 610 uses a 3-mass plant model 600 of the EPS system 12, which may be described by the following mathematical expressions in continuous time.

$$\dot{x} = Ax + Bu + Ed;  \text{ and}$$

$$y = Cx, \quad \text{Eq (13)}$$

where x is a state vector including values of the current state of the EPS system 12, u is an input vector including measurable (and controllable) inputs to the EPS system 12, and d is a disturbance vector including measurable values that are not controllable, and typically non-linear in nature. Further, y is an output vector that is based on the current state x of the EPS system 12. A, B, C, and E, are configurable matrices which are setup to model the motor 19 of the EPS system 12. In one or more examples, the matrices may be preconfigured. Because the plant's current outputs and its future state are both determined based on the current states and the current inputs, the output of the plant, y(k) is used to steer the state of the state observer module 610.

Consider that in the 3-mass plant model 600, the EPS system 12 experiences a driver torque $T_d$, an assist torque $T_a$, and a rack force or equivalent rack torque $T_r$. The driver torque represents the force applied by the operator/driver of the vehicle 10 on the handwheel to steer the vehicle 10. The assist torque represents the driver assist torque provided by the motor 19 of the EPS system 12 to assist the driver to steer the vehicle 10. The rack torque represents forces, such as friction, experienced by the rack and pinion 312 of the EPS system 12 as the vehicle 10 is operating; for example, friction from the wheels 28 and 30 contacting a road surface etc.

In case of the 3-mass plant model 600, the velocity observer module 610 uses the assist torque $T_a$ as the system input u, a torsion bar torque $T_{bar}$ and a handwheel angle $\theta_{hw}$ as a part of the measured state x. The velocity observer module 610 computes and subsequently outputs the estimated base motor velocity estimate using the 3-mass plant model 600. The state space description of the observer is given below.

$$\dot{\hat{x}}_b = A_b \hat{x}_b + B_b u_b + L_b(y_b - C_b \hat{x}_b), \quad \text{Eq (14)}$$

where the state, input and output vectors are $\hat{x}_b = [\theta_{HW}\ \omega_{HW}\ \theta_{AM}\ \omega_{AW}\ \theta_m\ \omega_m]^T$, $u_b = T_e$, $y_b = [T_{HW}\ \theta_{HW}]^T$, and the control signal is estimated from the measured current and estimated voltage constant as $T_e = \tilde{K}_e I_m$. The tuning of the observer gain matrix $L_b$ may be performed using techniques such as pole placement or any of the optimal control techniques. The remaining observer matrices are constructed using estimated parameters in the plant model as shown below.

$$A_b = \begin{bmatrix} 0 & 1 & 0 & 0 & 0 & 0 \\ -\frac{K_C}{J_{HW}} & -\frac{b_C + b_{HW}}{J_{HW}} & \frac{K_C}{J_{HW}} & \frac{b_c}{J_{HW}} & 0 & 0 \\ 0 & 0 & 0 & 1 & 0 & 0 \\ \frac{K_C}{J_{AM}} & \frac{b_c}{J_{AM}} & -\frac{K_C + K_{coup} + K_L}{J_{AM}} & -\frac{b_{AM} + b_{coup}}{J_{AM}} & \frac{K_{coup}}{J_{AM}} & \frac{b_{coup}}{J_{AM}} \\ 0 & 0 & 0 & 0 & 0 & 1 \\ 0 & 0 & \frac{K_{coup}}{J_m} & \frac{b_{coup}}{J_m} & -\frac{K_{coup}}{J_m} & -\frac{b_{coup} + b_m}{J_m} \end{bmatrix}; \quad \text{Eq (15)}$$

$$B_b = \begin{bmatrix} 0 & 0 & 0 & 0 & 0 & \frac{1}{J_m} \end{bmatrix}^T; \text{ and}$$

$$C_b = \begin{bmatrix} -K_C & 0 & K_C & 0 & 0 & 0 \\ 1 & 0 & 0 & 0 & 0 & 0 \end{bmatrix}$$

where all the parameters are estimates of the actual parameters of the mechanical system. The parameters in the matrices A, B, C, and D, include inertia (J), damping (K), and stiffness (b) of the handwheel 14, assist subsystem 18, and the motor 19. The state space representation can be converted to transfer matrix form by taking the Laplace transform as shown below.

$$\hat{X}_b = (sI_b - A_b + L_b C_b)^{-1} B_b U_b + (sI_b - A_b + L_b C_b)^{-1} L_b Y_b \quad \text{Eq(16)}$$

where $I_b$ is the identity matrix. Further solving for the velocity estimate, the expression for the velocity estimate is as follows.

$$\hat{\omega}_m = [M_{\omega T} M_{\omega \theta} M_{\omega I}][T_{HW}\ \theta_{HW}\ I_m]^T \quad \text{Eq (17)}$$

It should be understood that while the observer matrices are shown for a 3-mass plant model, a simpler model such as a 2-mass or 1-mass model may also be used in other examples instead. Also, a reduced order observer implementation can be used. In the above equation, M terms depict "Mechanical" terms, representing transfer functions that represent the dynamics of the velocity estimate because of each of the input signals. For example, $M_{\omega T}$ represents the dynamics the motor velocity estimate exhibits when subjected to $T_{HW}$ (handwheel or torsion bar torque) input.

Figure 8:
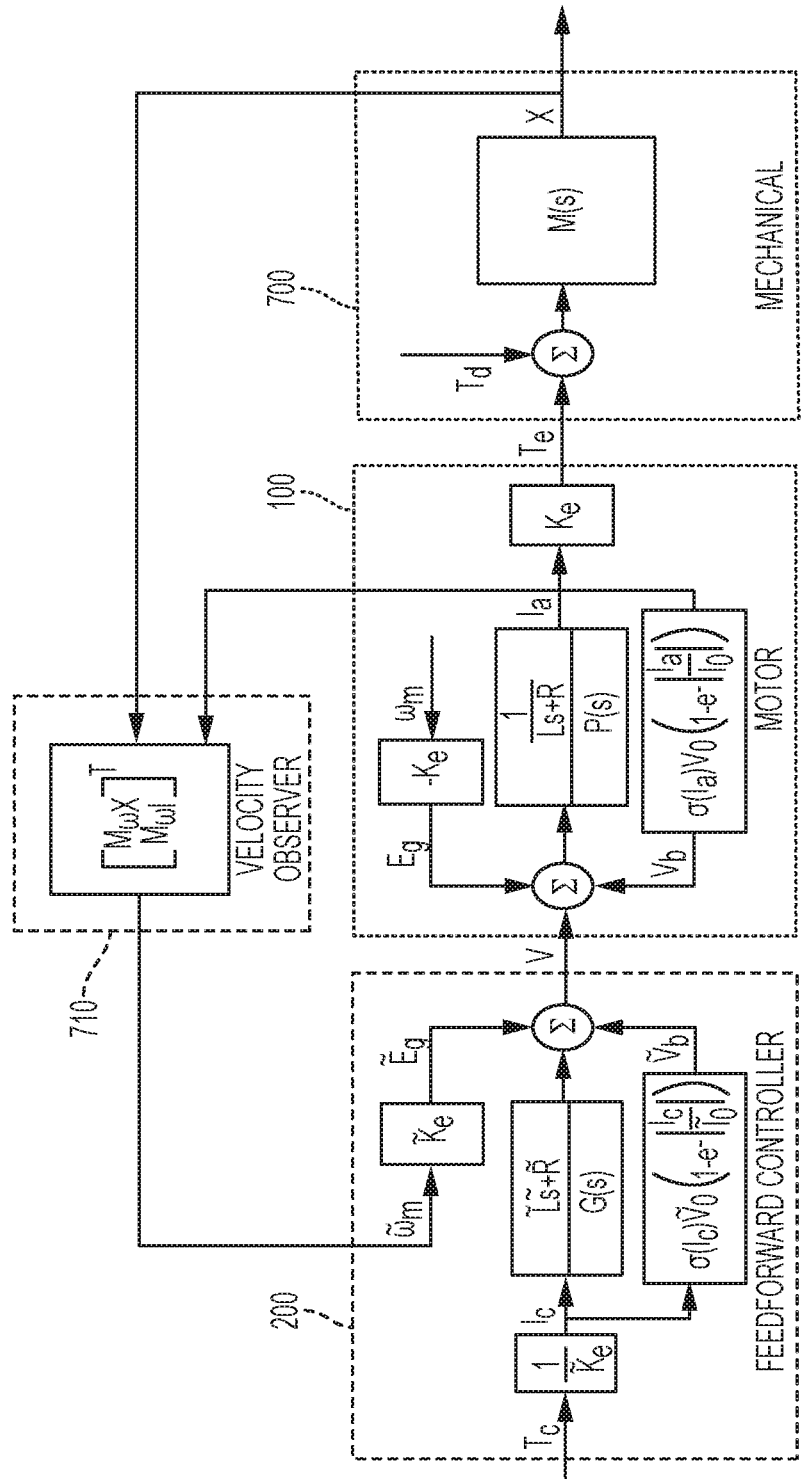
FIG. 8 depicts a block diagram of a motor control system for operating a PMDC motor using feedforward current control with a velocity observer implemented using the mechanical plant model of a general electro-mechanical system in which the PMDC drive system is being used according to one or more embodiments.

FIG. 8 depicts a block diagram of a motor control system for operating a PMDC motor using feedforward current control using a mechanical plant model of a general electromechanical system the motor is being used according to one or more embodiments. The feedforward motor control system 200 of the PMDC motor 100 uses an observer module 710 that uses a mechanical model 700 of the system that the PMDC motor 100 is being used in. The system depicted in FIG. 8 is a generic version of the system depicted in FIG. 7, where the mechanical model of the EPS 12 is used. In the more generic case depicted in FIG. 8, X represents all the measured outputs that may be utilized for the observer design. The transfer matrix of the observer 700 may be written as follows.

$$\hat{\omega}_m = [M_{\omega X} M_{\omega I}][XI_m]^T \quad \text{Eq (18)}$$

Figure 9:
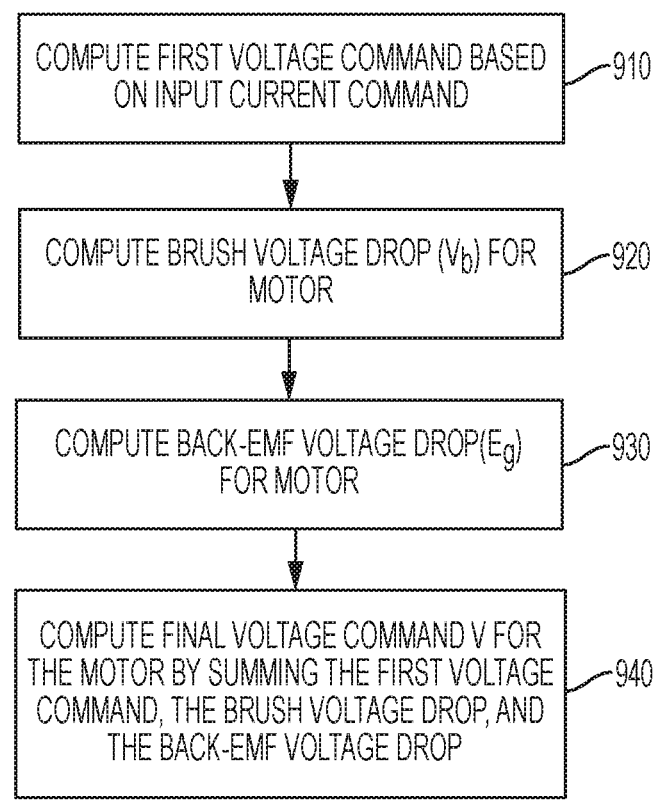
FIG. 9 illustrates a flowchart of an example method for controlling current of a PMDC motor using feedforward control according to one or more embodiments.

FIG. 9 illustrates a flowchart of an example method for controlling current of a PMDC motor using feedforward control according to one or more embodiments. The method includes computing a voltage command for the motor based on an input current, which in turn may be based on an input current command, as shown at 910. The voltage command may be computed using an inductance and resistance of the motor control system as described herein.

The method further includes computing a brush drop voltage ($V_b$) of the motor, as shown at 920. The brush drop voltage is computed based on the input current, for example using expression in equation 2 herein using predetermined brush drop parameters. Alternatively, or in addition, the brush drop voltage may be computed using measured currents if such current measurement circuitry is included in the system.

The method further includes computing a back-EMF drop voltage ($E_g$) of the motor, as shown at 930. For computing the back-EMF drop voltage, a predetermined back-EMF parameter and a motor velocity signal is used. In one or more examples, the motor velocity signal may be received from a motor velocity sensor (FIG. 4). Alternatively, the motor velocity signal is estimated based on a motor position sensor (FIG. 5). Alternatively yet, the motor velocity signal is estimated based on a mechanical model of the system in which the PMDC motor is being used (FIGS. 7, and 8).

The method further includes composing a final voltage command for the motor based on the first voltage command, the brush drop voltage, and the back-EMF drop voltage, as shown at 940. In one or more examples, the sum of the three components is provided to the motor to generate a corresponding current that causes the motor to rotate and generate a corresponding torque.

Figure 10:
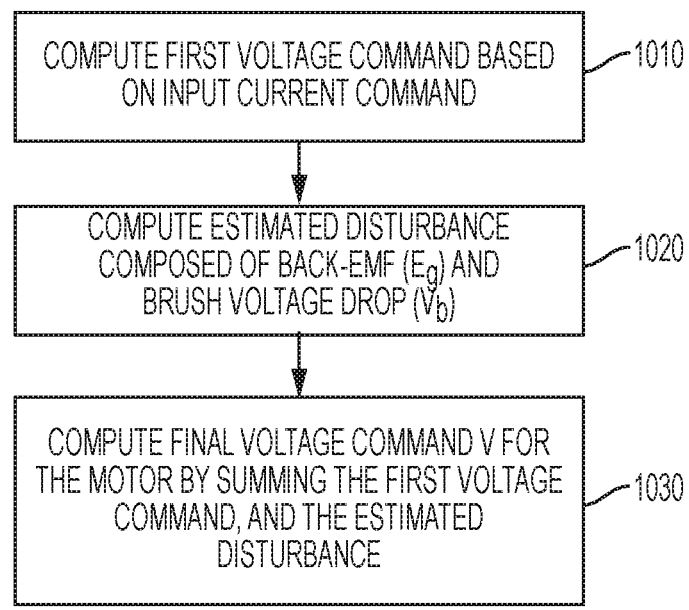
FIG. 10 illustrates a flowchart of an example method for controlling current of a PMDC motor using feedforward control according to one or more embodiments.

FIG. 10 illustrates a flowchart of an example method for controlling current of a PMDC motor using feedforward control according to one or more embodiments. The method includes computing a voltage command for the motor based on an input current, which in turn may be based on an input current command, as shown at 1010. The voltage command may be computed using an inductance and resistance of the motor control system as described herein.

The method further includes computing estimated disturbance of the motor composed of back-EMF and brush drop voltage, as shown at 1020. In one or more examples, the disturbance is estimated using a disturbance observer module that uses a measured current output of the motor to estimate the disturbance.

The method further includes composing a final voltage command for the motor based on the first voltage command and the estimated disturbance, as shown at 1030.

In one or more examples, the method for feedforward control may be implemented by the control module 40 to an assist motor in an EPS 12, however the technical solutions are not limited to an EPS 12 and can be used in other applications, such as rotor pump, power tools, watercrafts, and the like. The control module 40 may be electronic circuit such as a processor, integrated circuit, application specific integrated circuit, or any other electronic circuit that provides motor control.

The technical solutions described herein facilitate feedforward control of a PMDC motor by estimating a motor velocity in various different manners. The frequency responses from input torque command $T_c$ to electromagnetic torque $T_e$ (assuming zero brush drop) for the different feedforward control implementations, as well as frequency responses of the open-loop transfer function of the EPS system from input torque command $T_c$ to the handwheel torque $T_{HW}$ demonstrate that torque (and current) control dynamic performance (bandwidth), and thus the stability margins of motor control systems, are comparable between feedback and (various) feedforward current control architectures for PMDC drives described herein. Technical solutions described herein use one or more configurations of feedforward control of PMDC machines, including both sensor and observer based control techniques. Although embodiments are described using an EPS system, it should be noted that the technical solutions described herein can be used for feedforward current (torque) control of any electrical subsystem using PMDC electric drive and is not limited to any specific mechatronic system or product.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:
1. A motor control system for a motor comprising:
   a feedforward control module configured to control an output torque generated by the motor by:
   computing a first voltage command for the motor based on an input torque signal;

computing a second voltage command for the motor based on a brush drop voltage of the motor and a back-EMF drop voltage of the motor;

computing a voltage command for the motor by summing the first voltage command and the second voltage command; and sending the voltage command to the motor for generating the output torque.

2. The motor control system of claim 1, wherein the first voltage command is computed based on an electrical inductance of an electrical circuit of the motor.

3. The motor control system of claim 2, wherein the first voltage command is computed further based on electrical resistance of the electrical circuit of the motor.

4. The motor control system of claim 1, wherein computing the second voltage command comprises:

computing the brush drop voltage based on predetermined brush drop parameters.

5. The motor control system of claim 1, wherein computing the second voltage command further comprises:

computing the back-EMF drop voltage of the motor based on a predetermined back-EMF parameter and a motor velocity signal.

6. The motor control system of claim 5, wherein computing the second voltage command further comprises:

receiving a motor position signal, and computing the motor velocity using the motor position signal.

7. The motor control system of claim 5, wherein computing the second voltage command further comprises:

estimating the motor velocity signal using a mechanical plant model of a system in which the motor control system is being used.

8. The motor control system of claim 1, wherein computing the second voltage command further comprises:

computing a disturbance estimate of the motor control system based on a plant model of the motor control system, the disturbance estimate being composed of the brush drop voltage of the motor and a back-EMF drop voltage of the motor.

9. A method for controlling a motor using feedforward control, the motor being a permanent magnet DC, and the method comprising:

computing a first voltage command for the motor based on an input torque signal;

computing a second voltage command for the motor based on a brush drop voltage of the motor and a back-EMF drop voltage of the motor;

computing a voltage command for the motor by summing the first voltage command and the second voltage command; and sending the voltage command to the motor for generating an output torque.

10. The method of claim 9, wherein the first voltage command is computed based on an electrical inductance of an electrical circuit of the motor and an electrical resistance of the electrical circuit of the motor.

11. The method of claim 9, wherein computing the second voltage command comprises:

computing the brush drop voltage based on predetermined brush drop parameters.

12. The method of claim 9, wherein computing the second voltage command further comprises:

computing the back-EMF drop voltage of the motor based on a predetermined back-EMF parameter and a motor velocity signal.

13. The method of claim 12, wherein computing the second voltage command further comprises:

receiving a motor position signal, and computing the motor velocity using the motor position signal.

14. The method of claim 12, wherein computing the second voltage command further comprises:

computing the motor velocity signal using a mechanical plant model of a system in which the motor control system is being used.

15. The method of claim 9, wherein computing the second voltage command further comprises:

computing a disturbance estimate of the motor control system based on a plant model of the motor control system, the disturbance estimate being composed of the brush drop voltage of the motor and a back-EMF drop voltage of the motor.

16. A computer program product comprising a non-transitory memory having therein one or more computer executable instructions, which when executed by a processor cause the processor to perform a method comprising:

generating an output torque using a motor by feedforward current control by:

computing a first voltage command for the motor based on an input torque signal;

computing a second voltage command for the motor based on a brush drop voltage of the motor and a back-EMF drop voltage of the motor;

computing a voltage command for the motor by summing the first voltage command and the second voltage command; and sending the voltage command to the motor for generating the output torque.

17. The computer program product of claim 16, wherein the first voltage command is computed based on an electrical inductance of an electrical circuit of the motor and an electrical resistance of the electrical circuit of the motor.

18. The computer program product of claim 16, wherein computing the second voltage command comprises:

computing the brush drop voltage based on predetermined brush drop parameters.

19. The computer program product of claim 16, wherein computing the second voltage command further comprises:

computing the back-EMF drop voltage of the motor based on a predetermined back-EMF parameter and a motor velocity signal.

20. The computer program product of claim 19, wherein computing the second voltage command further comprises:

computing the motor velocity signal using a mechanical plant model of the system.

* * * * *

UNITED STATES PATENT AND TRADEMARK OFFICE
CERTIFICATE OF CORRECTION

PATENT NO. : 10,404,197 B2
APPLICATION NO. : 15/715375
DATED : September 3, 2019
INVENTOR(S) : Perit Pramod and Rakesh Mitra It is certified that error appears in the above-identified patent and that said Letters Patent is hereby corrected as shown below:

On the Title Page

Item (72) Inventors should read:
Prerit Pramod, Saginaw, MI (US)
Rakesh Mitra, Saginaw, MI (US)

Signed and Sealed this
Twenty-fifth Day of October, 2022

Katherine Kelly Vidal
*Director of the United States Patent and Trademark Office*